S. A. OTIS.
HORSE-CAR POLE ATTACHMENT.

No. 176,042. Patented April 11, 1876.

WITNESSES
Frank G. Parker
A. K. Gile

INVENTOR
Samuel A. Otis
per William Edson Atty.

UNITED STATES PATENT OFFICE.

SAMUEL A. OTIS, OF BOSTON, MASSACHUSETTS.

IMPROVEMENT IN HORSE-CAR-POLE ATTACHMENTS.

Specification forming part of Letters Patent No. 176,042, dated April 11, 1876; application filed January 15, 1876.

*To all whom it may concern:*

Be it known that I, SAMUEL A. OTIS, of Boston, in the county of Suffolk and State of Massachusetts, have invented a certain new and useful Improvement in Fastenings for Coupling-Pins for Horse-Railroad and other Cars, of which the following is a specification:

My present invention relates to an improvement upon an invention for which Letters Patent of the United States were granted to me, said Letters Patent bearing date October 7, 1873, and numbered 143,459, entitled improvement in car-couplings; and consists in so connecting the fastening-hook to the pin that it may be free to swing freely and independently of the pin, the object being to prevent the pole when forcibly swung around by the horses from injuring the fastening-hook, or throwing it out of place. The invention also relates to the arrangement of the hook in relation to the draw-bar.

Figure 1:
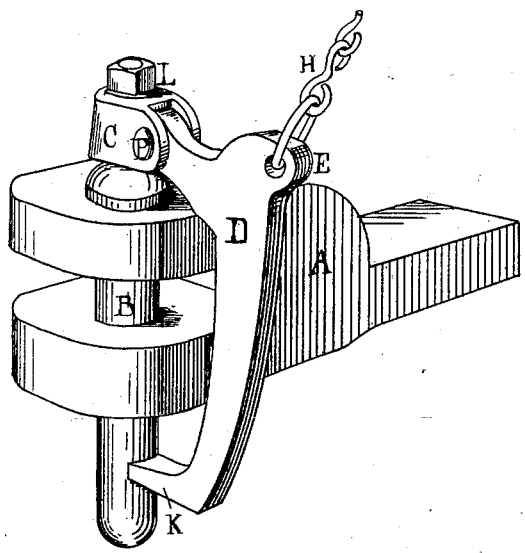
Figures 2, 3:
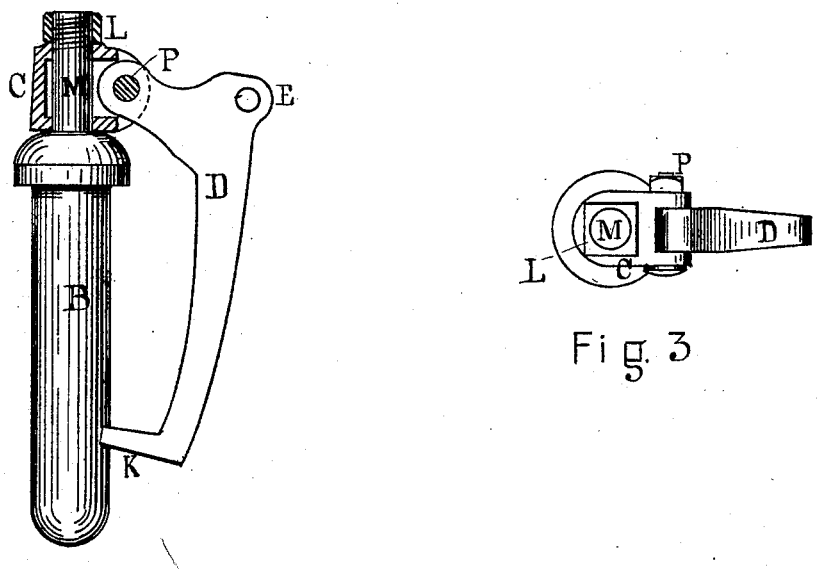

Figure 1 is a perspective view, showing my invention in connection with a portion of the draw-bar. Fig. 2 is an elevation of the pin and hook, showing the swivel by which the hook is connected to the pin in section. Fig. 3 is a plan, showing the top of the pin, the swivel, and the hook.

A, Fig. 1, represents a part of a draw-bar, which may be made in the ordinary manner. B, Figs. 1 and 2, is the coupling-pin, which has at its top a projecting spindle or start, M. Upon this start M I hang the swivel C, and fasten the same by the nut L, or by any other convenient device. To the swivel C, which is free to turn on the start M, I hang the swinging hook D by the pin P. This hook D has a point, K, at its lower end, as shown in Figs. 1 and 2, so that when the hook hangs in the position shown in Figs. 1 and 2 the point K passes beneath the lower side of the draw-bar, and prevents the pin from being thrown up out of the draw-bar by any sudden jolt of the car.

When it is desirable to draw the pin I have only to take hold of the chain H and pull it upward. This action will first cause the hook D to swing outwardly, so that the point K will clear the draw-bar, and then will lift the pin B out of the draw-bar, thus freeing the pole from the car.

By having the hook D attached to the pin B by a swiveling joint-piece, C, I prevent any injury to the hook by the sudden or forcible turning of the pole or link by the horses, for, notwithstanding the pole or link may bind the pin B so hard that it, the pin, cannot turn, yet the hook is free to be swung around by the pole or link, and is therefore not injured or forced out of place, as it would be if it were not free to swing independently of the pin.

The fastening as above constructed is sure to hold the pin, and cannot be thrown out of place by the turning of the pole or link.

Having now described the construction and operation of my invention, what I claim is as follows:

1. The combination of the pin B, hook D, and lifting chain or strap H, with the draw-bar A, substantially as described, and for the purpose set forth.

2. The combination of the pin B, start M, swivel C, and hook D, all operating together, substantially as described, and for the purpose set forth.

SAMUEL A. OTIS.

Witnesses:
WILLIAM EDSON,
FRANK G. PARKER.